(12) United States Patent
Oh

(10) Patent No.: US 7,260,415 B1
(45) Date of Patent: Aug. 21, 2007

(54) METHOD AND SYSTEM FOR LOCATION-BASED POWER CONTROL IN WIRELESS COMMUNICATIONS

(75) Inventor: Dae-Sik Oh, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 600 days.

(21) Appl. No.: 09/871,081

(22) Filed: May 31, 2001

(51) Int. Cl.
*H04B 7/00* (2006.01)

(52) U.S. Cl. ............ 455/522; 455/404.2; 455/456.1; 455/456.3

(58) Field of Classification Search ......... 455/404.1, 455/404.2, 440, 522, 69, 456.1, 456.2, 456.3, 455/456.4, 456.5; 370/318
See application file for complete search history.

(56) References Cited

U.S. PATENT DOCUMENTS

| | | | |
|---|---|---|---|
| 5,650,770 A | 7/1997 | Schlager et al. | |
| 5,940,743 A * | 8/1999 | Sunay et al. | 455/69 |
| 5,963,130 A | 10/1999 | Schlager et al. | |
| 6,154,638 A * | 11/2000 | Cheng et al. | 455/67.11 |
| 6,198,390 B1 | 3/2001 | Schlager et al. | |
| 6,341,224 B1 * | 1/2002 | Dohi et al. | 455/522 |
| 6,442,393 B1 * | 8/2002 | Hogan | 455/456.5 |
| 6,490,460 B1 * | 12/2002 | Soliman | 455/522 |
| 6,496,531 B1 * | 12/2002 | Kamel et al. | 375/130 |
| 6,603,976 B1 * | 8/2003 | Amirijoo et al. | 342/357.1 |
| 6,609,008 B1 * | 8/2003 | Whang et al. | 455/522 |
| 6,763,244 B2 * | 7/2004 | Chen et al. | 455/522 |
| 6,845,246 B1 * | 1/2005 | Steer | 455/522 |
| 2002/0123362 A1 * | 9/2002 | Kamel et al. | 455/522 |

* cited by examiner

*Primary Examiner*—Edward F. Urban
*Assistant Examiner*—Raymond S. Dean

(57) ABSTRACT

A method and system for power control in a wireless communication system. A base station determines the location of a mobile station and uses that location as a basis to select power control parameters, such as initial mobile station transmit power, initial base station transmit power, and reverse link setpoint. The base station instruct the mobile station to begin transmitting at the location-based initial mobile station transmit power, and the base station begins transmitting at the location-based initial base station transmit power. Power control then proceeds based on the location-based values. When the mobile station location changes, the process repeats, based on a new set of location-based power control parameters.

18 Claims, 4 Drawing Sheets

METHOD AND SYSTEM FOR LOCATION-BASED POWER CONTROL IN WIRELESS COMMUNICATIONS

BACKGROUND

1. Field of the Invention

The present invention relates to wireless communications and, more particularly, to a method and system for controlling the power level of signals transmitted over a cellular air interface between a base station and a mobile station.

2. Description of Related Art

Cellular wireless is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

In a typical cellular wireless system, an area is divided geographically into a number of cell sites, each defined by a radio frequency ("RF") radiation pattern from a respective base transceiver station ("BTS") antenna. The base station antennae in the cells are in turn coupled to a base station controller ("BSC"), which is then coupled to a telecommunications switch or gateway, such as a mobile switching center ("MSC") for instance. The MSC may then be coupled to a telecommunications network such as the PSTN (public switched telephone network) or the Internet.

When a mobile station (such as a cellular telephone, pager, or appropriately equipped portable computer, for instance) ("MS") is positioned in a cell, the MS and BTS can communicate with each other in various channels over the RF air interface. Communications from the BTS to an MS are considered to be in a "forward" direction, so the air interface channels used to carry such communications are referred to as the "forward link" channels. Conversely, communications from an MS to the BTS are considered to be in a "reverse" direction, so the air interface channels used to carry such communications are referred to as "reverse link" channels.

MS-BTS communications will typically suffer from varying levels of interference and signal degradation, due to factors such as (i) the number and power level of mobile stations concurrently communicating over the air interface, (ii) obstructions such as buildings or foliage, and (iii) the distance between the MS and the BTS. In order to account for this, the power level of signals transmitted between the MS and BTS can be dynamically adjusted.

For instance, in a Code Division Multiple Access ("CDMA") system operating according to industry standard IS-2000-2 (published in March 2000 as TIA/EIAIS-2000.2-A), the BSC and MS will engage in a two-part power control process for reverse link transmissions. In this process, the BSC will maintain a "setpoint," $E_b/N_o$, which is a decibel measure of the MS signal energy to noise (spectral density). The setpoint represents how strong the MS signal must be for the BTS to be able to successfully receive bits of data transmitted by the MS. Given a particular noise level in the air interface, if the received MS signal level is not high enough, the BTS might not be able to make out the bits of the signal compared to the background noise.

A typical BTS will have an initial setpoint designated by the manufacturer of the BTS for use with respect to all mobile stations that the BTS serves. Further, a BSC will continuously estimate the noise level in the air interface, based on various factors such as frame error rate or signal strength measurements reported by mobile stations, for instance.

When an MS is going to engage in a call, it will select an initial reverse link power level (i.e., the power level at which it will initially transmit to the BTS). Typically, the MS selects the initial transmit power based on its measurement of received signal power levels. For instance, if the MS receives a relatively high strength signal, it might logically conclude that it is relatively close to the base station, so it might be programmed to transmit to the BTS at a relatively low power level. Conversely, if the MS receives a relatively low level signal, it might be programmed to transmit to the BTS at a relatively high power level.

The first part of the reverse link power control process is called "open loop power control." In open loop power control, the BTS will measure the power level of the signal that it receives from the MS, which will have degraded from the time that it left the MS, and the BTS will provide the BSC with the measurement. Given this value and the BSC's estimate of noise in the air interface, the BSC will then establish a measured value of $E_b/N_o$, which the BSC will compare to the setpoint. If the measured $E_b/N_o$ does not match the setpoint, the BSC will instruct the MS to adjust its transmit power, typically by a predetermined increment. The BSC will then establish a new measured $E_b/N_o$ value and compare it to the setpoint, repeating the process until the measured $E_b/N_o$ matches the setpoint.

For instance, if the measured $E_b/N_o$ is too low compared to the setpoint, then the BSC will conclude that the MS needs to increase its transmit power and will therefore send a signaling message (a bit in a predetermined slot) to the MS instructing the MS to increase its transmit power, typically by 1 dB or another increment specified by the BSC. Similarly, if the measured $E_b/N_o$ is too high compared to the setpoint, then the BSC will conclude that the MS needs to decrease its transmit power and will therefore send a signaling message to the MS instructing the MS to decrease its transmit power, also typically by a 1 dB increment.

As an example, assume that (i) the initial setpoint is 5 dB, (ii) the MS transmits at 10 dBm and (iii) the estimated noise level is −65 dBm. Assume then that the BTS measures received MS signal energy of −61 dBm. The BSC will therefore compute a measured $E_b/N_o$ of 4 dB, which is lower than the setpoint by 1 dB. Consequently, the BSC will instruct the MS to raise its transmit power by 1 dB. As a result, the BTS might measure received MS signal energy of −60 dBm. The BSC will then compute a measured $E_b/N_o$ of 5 dB, which matches the setpoint. After matching the setpoint, communication has been successfully established between the BTS and the MS. The BTS and the MS will then enter into the next part of the power control process, referred to as "closed loop power control."

In closed loop power control, the BSC will continuously measure the frame error rate (FER) of received MS signals, i.e., the percentage of frames on the reverse link that are in error, and the BSC will compare it to a predetermined FER threshold. Further, the BSC will continue to measure the $E_b/N_o$ and compare it to the setpoint. Typically, the BSC will update and compare the FER at every 20 millisecond frame, and the BSC will update and compare the $E_b/N_o$ every 1.25 milliseconds.

If the measured FER is greater than a predetermined threshold, the BSC will conclude that the setpoint should be increased. Therefore, the BSC will increase the setpoint by an increment, such as 1 dB for instance. As a result, however, the setpoint may be pushed higher than the measured $E_b/N_o$. Therefore, the BSC will instruct the MS to increase its transmit power.

On the other hand, if the measured FER is less than the predetermined threshold, the BSC will conclude that the setpoint should be reduced. Therefore, the BSC will reduce the setpoint, similarly by an increment such as 1 dB for instance. As a result, the setpoint may be pushed lower than the measured $E_b/N_o$. Therefore, the BSC will instruct the MS to reduce its transmit power.

Note that, in addition to the initial setpoint, a BTS will also have maximum and minimum settings for the reverse link setpoint. These maximum and minimum settings will define bounds beyond which the BSC will not adjust the setpoint during closed loop power control.

To illustrate this closed loop power control process, continue further with the example above. In the example, assume, for instance, that (i) the FER threshold is 2%, (ii) the BSC measures an FER of 3% and a received MS signal energy of −60 dBm, and (iii) the estimated noise level remains at −65 dBm. Because the measured FER exceeds the threshold FER, the BSC will increase the setpoint by 1 dB, to establish a new setpoint of 6 dB. However, the BSC will compute a measured $E_b/N_o$ of 5 dB, which is lower than the new setpoint. Consequently, the BSC will instruct the MS to increase its transmit power by 1 dB, which may cause the received MS signal energy to be −59 dBm. As a result, the measured $E_b/N_o$ will be 6 dB, which will match the new setpoint.

A similar power control process occurs for transmissions on the forward link. On the forward link, according to IS-2000, a BTS may have up to 61 traffic channels, for communicating with up to 61 different mobile stations at once (on a given frequency). Each traffic channel is defined by a separate "Walsh code," which is used as a basis for the BSC to encode and the MS to decode communications on the channel. For a given channel, the BTS will transmit to the MS at a certain power level, which is typically defined in party by a Digital Gain Unit ("DGU") parameter stored by the BSC. Specifically, a BTS manufacturer may specify a particular scale or algorithm to translate a DGU parameter into a forward link traffic channel power level.

In operation for a given traffic channel, the BSC will select an initial DGU and will translate the initial DGU into an initial forward link power level, at which the BTS will transmit traffic to the MS. As the MS receives the traffic, the MS will monitor the FER and will report the FER to the BTS in an IS-2000 Power Measurement Report Message ("PMRM"). When the BTS receives the PMRM, the BSC will determine if the FER is greater than a predetermined threshold (such as 1% for instance).

If the BSC determines that the FER is greater than the threshold, then the BSC will select a higher DGU, which will translate into a higher power level at which the BTS will transmit to the MS. On the other hand, if the BSC determines that the FER is less than the threshold, then the BSC will select a lower DGU, which will translate into a lower power level.

SUMMARY

The existing power control system suffers from some inherent deficiencies. To begin with, in typical reverse link power control, the initial setpoint is established generically for all mobile stations. Often, the initial generic setpoint is thus far off from where it should be for a particular mobile station. Given that the open loop power control process functions to match MS transmit power to the setpoint, the process is likely to establish an MS transmit power that produces an unacceptable frame error rate.

Further, a mobile station will usually transmit at an initial power level that is far off from where it should really be transmitting. This can occur when a mobile station selects its initial transmit power based on received signal strength, because the mobile station may fail to adequately compensate for multi-source signals and other factors. When the mobile station begins to transmit at a power level that is far off from where it should be, the process of stabilizing MS transmit power then becomes more difficult.

Still further, the noise estimate maintained by the BSC may be largely generic to a particular sector. Although it might be dynamically adjusted based on MS received signal strength measurements, it is unlikely to take into account certain factors that contribute to noise or to the total MS received signal level. For instance, the estimate is unlikely to consider the fact that a mobile station at a particular location is receiving multi-path transmissions (where signals bounce off various obstructions and arrive at their destinations with assorted propagation losses). With an accurate noise estimate, the power control process is likely to result in MS transmit powers, and therefore frame error rates, that are too high or too low.

Similarly, although to a lesser extent, on the forward link, the initial DGU selected for use on a given channel is often established generically. As a result, the MS-measured FER is likely to differ greatly from the predetermined FER threshold. Therefore, the BSC and MS will similarly have to engage in repeated communications, as the BSC incrementally changes the DGU and consequently the forward link transmit power, until the forward link FER stabilizes.

The present invention helps to overcome these problems by selecting initial power control parameters based on the actual (or estimated) current location of the MS with which the BTS is communicating. These parameters may include, for instance, (i) an initial setpoint, (ii) an initial MS transmit power, and (iii) an initial DGU or forward link transmit power.

In accordance with an exemplary embodiment of the invention, the BSC (or other entity) will have access to a database that correlates locations with power control parameters. The BSC will regularly monitor the location of a given MS, and, when the BSC detects a change in MS location, the BSC will responsively refer to the database to obtain new location-based power control parameters.

On the reverse link, the BSC will then instruct the MS to begin transmitting at the location-based initial MS transmit power, and the BSC and MS will then engage in open loop power control with respect to the location-based setpoint. After matching the location-based setpoint, the BSC and MS will then repeatedly engage in closed loop power control, adjusting MS power to match the setpoint, and adjusting the setpoint to match the FER threshold.

Thus, in one respect, an exemplary embodiment of the invention may take the form of a method of controlling power of communications between a mobile station and a base station. The method can involve determining a location of the mobile station and then, based on the location, selecting a power level for communication between the mobile station and the base station. The method can then involve causing communication between the mobile station and the base station at the selected power level (i.e., doing something to invoke such communication, and/or actually performing the communication).

The selected power level could be a reverse link power level, i.e., an MS transmit power. Alternatively, the selected power level could be a forward link power level, i.e., a base station transmit power, or a DGU that corresponds to a forward link traffic channel power level.

Alternatively, the method may involve determining the MS location, and then, based on the MS location, selecting a reverse link setpoint. The method may then involve using that reverse link setpoint as a basis to manage mobile station transmit power. For instance, a measured value of $E_b/N_o$ can be compared to the reverse link setpoint and, if it does not match, the mobile station can be instructed to change its transmit power. The method may further involve computing an FER of a signal received from the mobile station and comparing that FER to a threshold. If the FER does not match the threshold, the reverse link setpoint can be adjusted, and the adjusted reverse link setpoint can then be used as a basis to manage mobile station transmit power. Additionally, the method may involve selecting a bounding setpoint value (i.e., at least one such value) based on the mobile station location and using that bounding setpoint value as a basis to limit setpoint adjustments.

In yet another respect, an exemplary embodiment could take the form of a base station programmed to perform the functions of any of these methods. For instance, the base station could be programmed with machine language instructions to determine a mobile station location and to then use that location as a basis to select power control parameters, and the base station could then carry out a power control process based on those location-based power control parameters.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
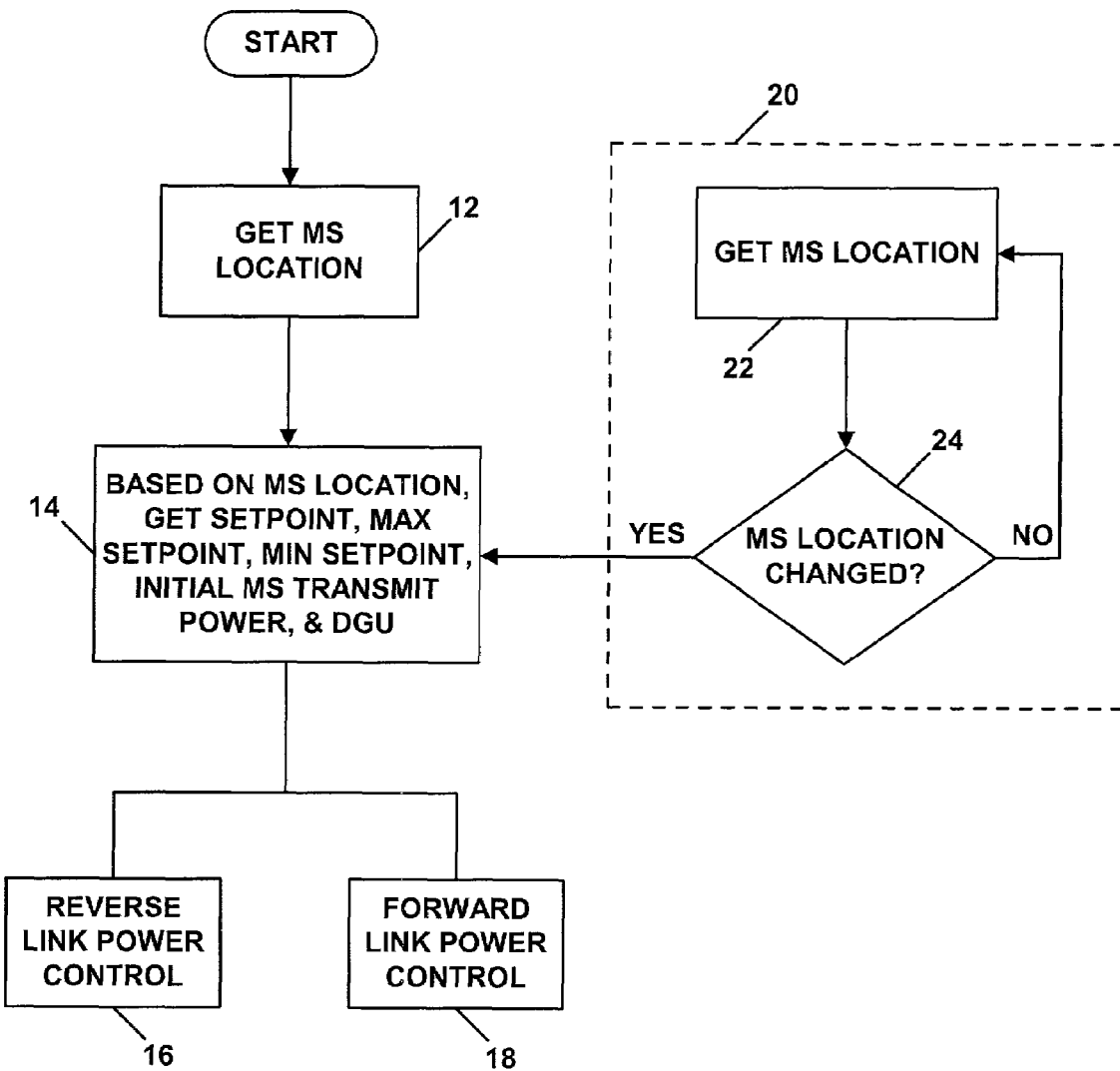
FIG. 1 is a flow chart depicting functions of a power control process arranged in according to the exemplary embodiment.

In accordance with the exemplary embodiment, the BSC will maintain a database (i.e., data file) that correlates given locations with given initial (or "normal") setpoints, MS transmit power levels, and DGUs. For instance, for a given BTS, the database might include a table that defines the following fields for each record:
1. MS LOCATION
2. INITIAL SETPOINT
3. MAXIMUM SETPOINT
4. MINIMUM SETPOINT
5. INITIAL MS TRANSMIT POWER
6. INITIAL DGU Alternatively, the database might differ in some way. For example, the database could include a separate reverse link table keyed to MS location and/or a separate forward link table keyed to MS location. The reverse link table could set forth items 2-5 as listed above, and the forward link table could set forth item 6. As another example, one or more of the items listed above could be omitted, or additional items could be added.

The power control parameters listed in the database may be referred to as location-based values. Thus, the parameters listed above may be referred to as "location-based setpoint," "location-based maximum setpoint," "location-based minimum setpoint," "location-based MS transmit power," and "location-based DGU."

In the exemplary embodiment, when an MS is going to engage in a call, the BSC will determine the location of the MS. The BSC will then refer to the database to identify the power-control parameters that correspond with the location. Power control will then proceed based on these location-based values. Further, the BSC will continue to monitor the MS location and will update these values based on the most current MS location.

The MS location listed in the database could be a geographical position, indicated by latitude/longitude coordinates (i.e., a geocode). Alternatively, the location in the table could be a vector from the BTS antenna to the geographical position of the mobile station (as defined by (i) the distance from the BTS antenna (i.e., at the height of the BTS tower) to the geographical position of the MS and (ii) the angle between the antenna azimuth and the line from the BTS antenna to the MS). Other examples are possible as well.

Advantageously, by keying the initial setpoint, initial MS transmit power and/or initial DGU to the actual location of the MS, these initial settings can be based on factors associated with the actual communication path between the BTS antenna and the MS. Being more reality-based, the initial settings can thus be more accurate, which means that less effort will likely be required to stabilize power levels.

For instance, on the reverse link, the initial setpoint and initial MS transmit power level for a given location can be established based on considerations of (i) what obstructions exist between that location and the BTS antenna and (ii) how far that location is from the BTS antenna. With fewer obstructions, the propagation loss is likely to be less, so the setpoint and MS transmit power level can logically be lower, and vice versa. Similarly, with a shorter distance between the location and the BTS antenna, the propagation loss is likely to be less, so the setpoint and power level can logically be lower, as well, and vice versa. Similarly, on the forward link as well, with fewer obstructions and a shorter distance between the BTS antenna and the MS, the propagation loss is likely to be less, so the initial DGU can logically be set lower than it would be otherwise.

The exemplary database can be populated with the values indicated above through any of a variety of procedures, and the contents of the database can be updated as desired. For instance, one way of establishing the database values for a given BTS is to model the signal levels throughout the BTS coverage area, with the assistance of a program such as Planet DMS2.2 (available from Metapath Software International, London, England. The carrier can input into the program parameters such as the model of the BTS, the antenna model, height and azimuth, and geographical information such as the latitude and longitude coordinates of buildings and other obstructions in the air interface. The program can then provide an indication, per geographic location, of likely base station signal strength and mobile station signal strength. In turn the carrier can use that output data to establish location-based values of setpoint, MS transmit power and DGU.

Other methods of populating the database are possible as well. For instance, a carrier could employ mobile reporting systems that collect data from throughout a BTS coverage area. Technicians can travel throughout the BTS coverage area and measure MS received signal strength and FER, recording the values per GPS location. Further, the BTS can log data such as $E_b/N_o$, DGU, and FER. And the carrier can then correlate the MS data with the BTS data, so as to establish location-based power control parameters. Still other methods may exist as well.

Referring now to the Figures, flow charts are provided to help illustrate operation of the exemplary embodiment. The functions set forth in the flow charts can be carried out by an appropriately programmed base station. For instance, a BSC can have a processor programmed with machine language instructions to carry out the functions recited. Alternatively or additionally, the base station may have hardware designed to carry out the functions.

Referring first to FIG. 1, at block 12, the BSC first determines the location of an MS that is about to engage in a call. The BSC may do so in any of a variety of ways, preferably employing what have become increasingly conventional location-determining technologies. For example, if the MS is equipped with a location-determining mechanism such as a GPS module, the MS can regularly determine and report its current location to the BSC, using industry standard messaging (such as that defined by industry standard IS-801 (published in October 1999 as TIA/EIA/IS-801)). As another example, a cellular carrier can employ any of a variety of network-based positioning determining equipment and techniques (such as triangularization, for instance) to establish measurements of MS location. The carrier may maintain a record of MS location in a mobile positioning center ("MPC"), and the BSC may query the MPC to identify the location of a given MS. Other examples are possible as well.

Once the BSC determines the MS location, at block 14, the BSC queries the database to obtain values of setpoint, maximum setpoint, minimum setpoint and initial MS transmit power, and DGU. The BSC may do so itself. Alternatively, another entity could obtain the location-based power control values from the database and could report the values to the BSC. Still other arrangements are possible as well.

Provided with the location-based power control parameters, the reverse link and forward link power control processes then proceed based on those values. The reverse link power control process proceeds at block 16 and is further illustrated by FIGS. 2-4, and the forward link power control process proceeds at block 18 and is further illustrated by FIG. 5.

However, in accordance with the exemplary embodiment, the BSC also continues to monitor the MS location as shown by block 20 and will begin the process again each time the BSC detects a change in MS location. In particular, at block 22, the BSC determines the MS location. At block 24, the BSC then determines whether the MS location has changed since the BSC last determined it. For instance, the BSC may determine whether the MS location has changed more than a predetermined amount since the last location. In response to a determination that the location has not changed, the BSC returns to block 22 to again determine the MS location. However, in response to a determination that the MS location has changed, the BSC then interrupts the reverse link and forward link power control processes and continues processing at block 14, based on the new MS location.

Figure 2:
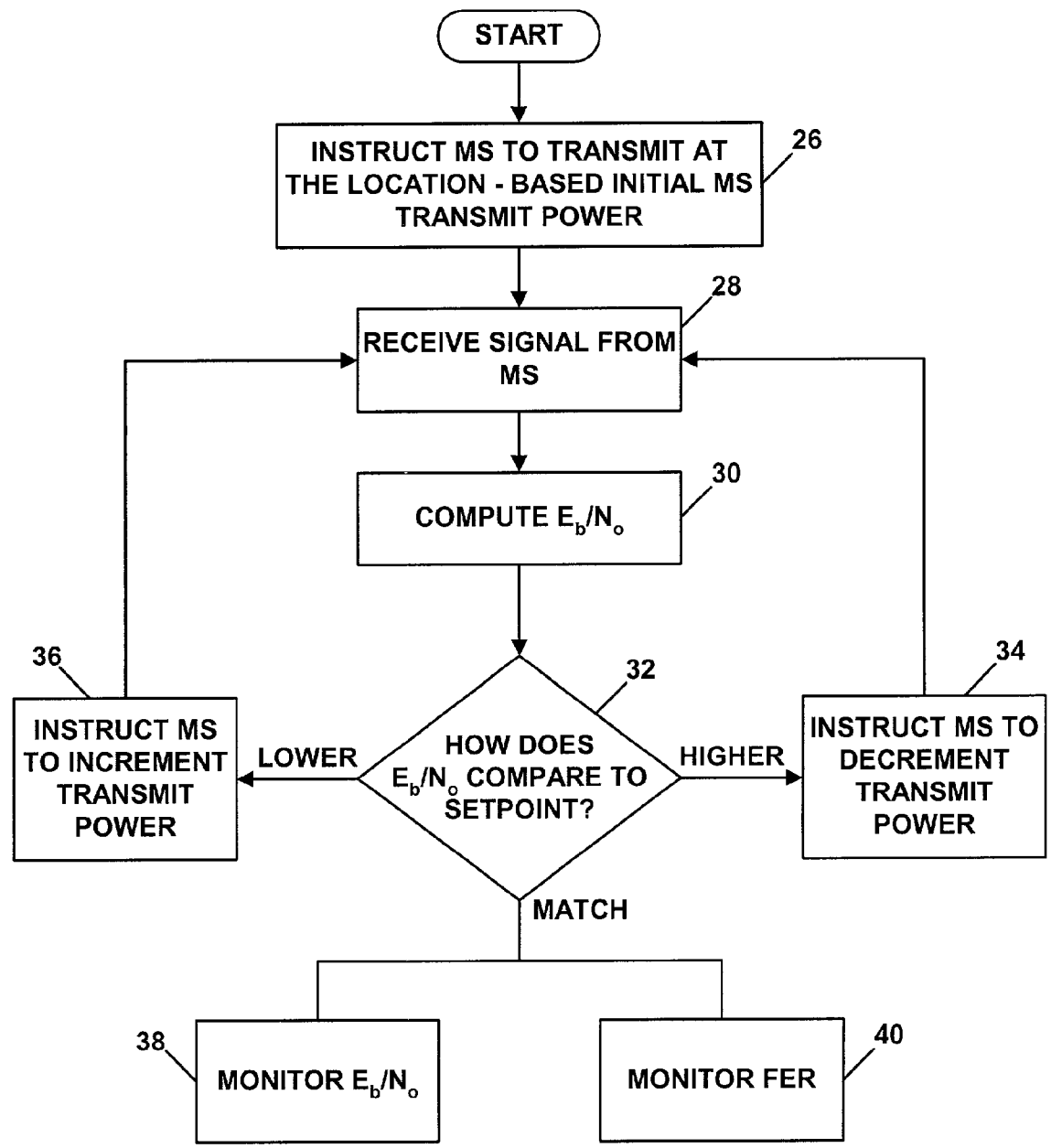
FIG. 2 is a flow chart depicting functions of a reverse link open loop power control process according to the exemplary embodiment.
Figure 3:
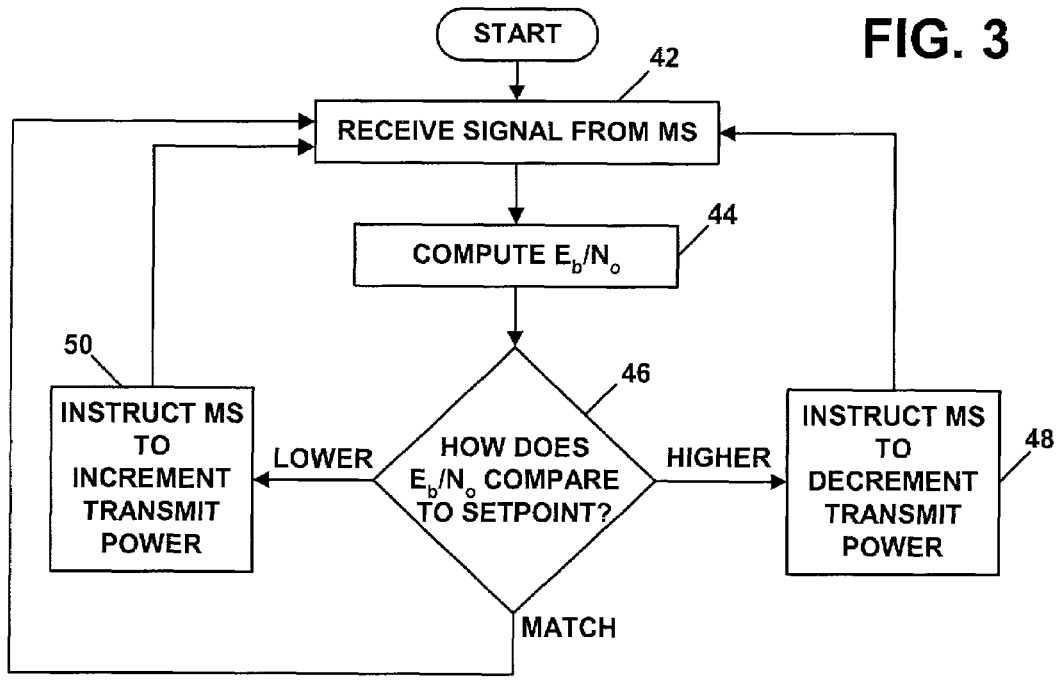
FIG. 3 is a flow chart depicting some of the functions of a reverse link closed loop power control process according to the exemplary embodiment.
Figure 4:
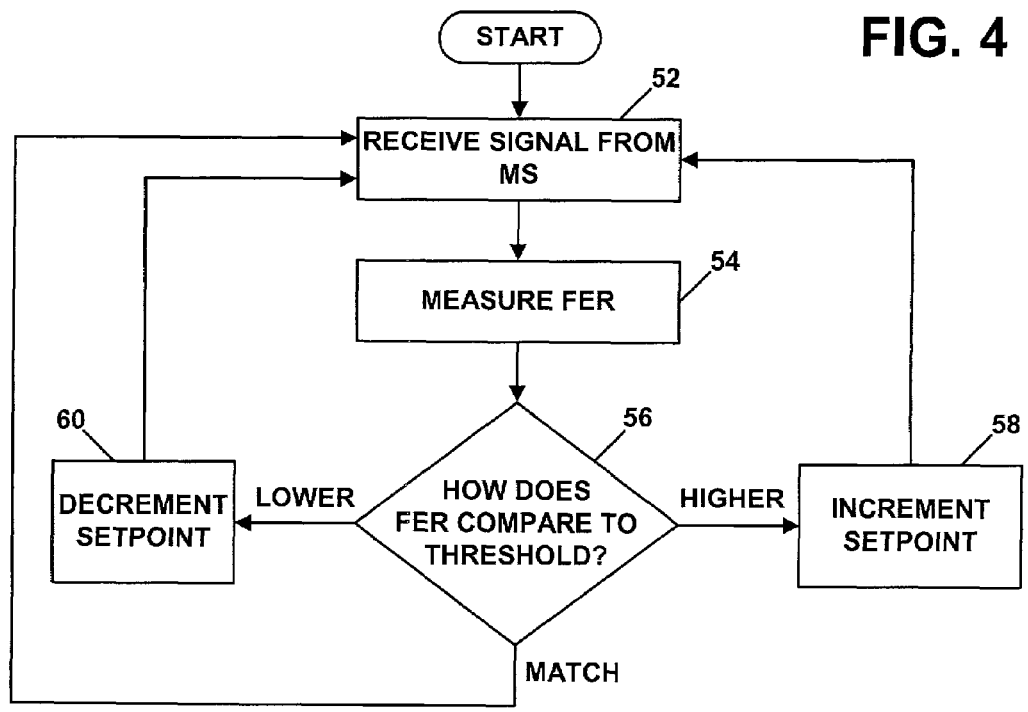
FIG. 4 is a flow chart depicting other functions of the reverse link closed loop power control process according to the exemplary embodiment.

Referring now to FIGS. 2-4, an exemplary reverse link power control process is shown. The first part of this process is open loop power control, illustrated in FIG. 2. As shown in FIG. 2, at block 26, the BSC first instructs the MS to transmit at the location-based initial MS transmit power. In the exemplary embodiment, the BSC can do so by sending to the MS a predetermined signaling message that indicates the designated MS transmit power. An exemplary MS should be programmed in turn to read the signaling message and to responsively transmit to the BTS at the designated transmit power.

At block 28, the BSC then receives a signal from the MS, which the MS presumably transmitted at the designated transmit power. At block 30, based on that signal and the BSC's current estimate of noise in the air interface, the BSC computes a measured value of $E_b/N_o$. At block 32, the BSC then compares that value of $E_b/N_o$ to the current setpoint (which is the location-based setpoint). If the $E_b/N_o$ is higher than the setpoint, then, at block 34, the BSC instructs the MS to decrement its transmit power (e.g., by sending a "1" power control bit to the MS), and the BSC returns to block 28. If, however, the $E_b/N_o$ is lower than the setpoint, then, at block 36, the BSC instructs the MS to increment its transmit power (e.g., by sending a "0" power control bit to the MS), and the BSC returns to block 28. Once the BSC determines that the $E_b/N_o$ matches the setpoint, the BSC proceeds to closed loop power control.

Closed loop power control involves two concurrent processes. As shown at block 38, and as further illustrated by FIG. 3, one process is monitoring of the $E_b/N_o$, similar to open loop power control. And as shown at block 40 and further illustrated by FIG. 4, the other process is monitoring frame error rate. The process of monitoring $E_b/N_o$ preferably repeats every 1.25 milliseconds, and the process of monitoring frame error rate preferably repeats every 20 milliseconds (i.e. at each frame).

Referring to FIG. 3, at block 42, the BSC receives a signal from the MS. At block 44, based on that signal and the BSC's current estimate of noise in the air interface, the BSC computes a measured value of $E_b/N_o$. At block 46, the BSC then compares that value of $E_b/N_o$ to the current setpoint. If the $E_b/N_o$ is higher than the setpoint, then, at block 48, the BSC instructs the MS to decrement its transmit power, and the BSC returns to block 42. If, however, the $E_b/N_o$ is lower than the setpoint, then, at block 50, the BSC instructs the MS to increment its transmit power, and the BSC returns to block 42. In the event the $E_b/N_o$ matches the setpoint, then the BSC simply returns to block 42.

Referring next to FIG. 4, at block 52, the BSC receives a signal from the MS. At block 54, the BSC measures the frame error rate in that signal. In turn, at block 56, the BSC compares that measured FER to a threshold FER (e.g., 1%). If the measured FER is higher than the threshold FER, then, at block 58, the BSC increments the setpoint (but preferably to no higher than the location-based maximum setpoint), and the BSC returns to block 52. If, however, the measured FER is lower than the threshold FER, then, at block 60, the BSC decrements the setpoint (but preferably to no lower than the location-based minimum setpoint), and the BSC returns to block 52. These changes in setpoint will responsively impact the procedure of FIG. 3. In the event the FER matches the threshold FER, the BSC simply returns to block 52.

Figure 5:
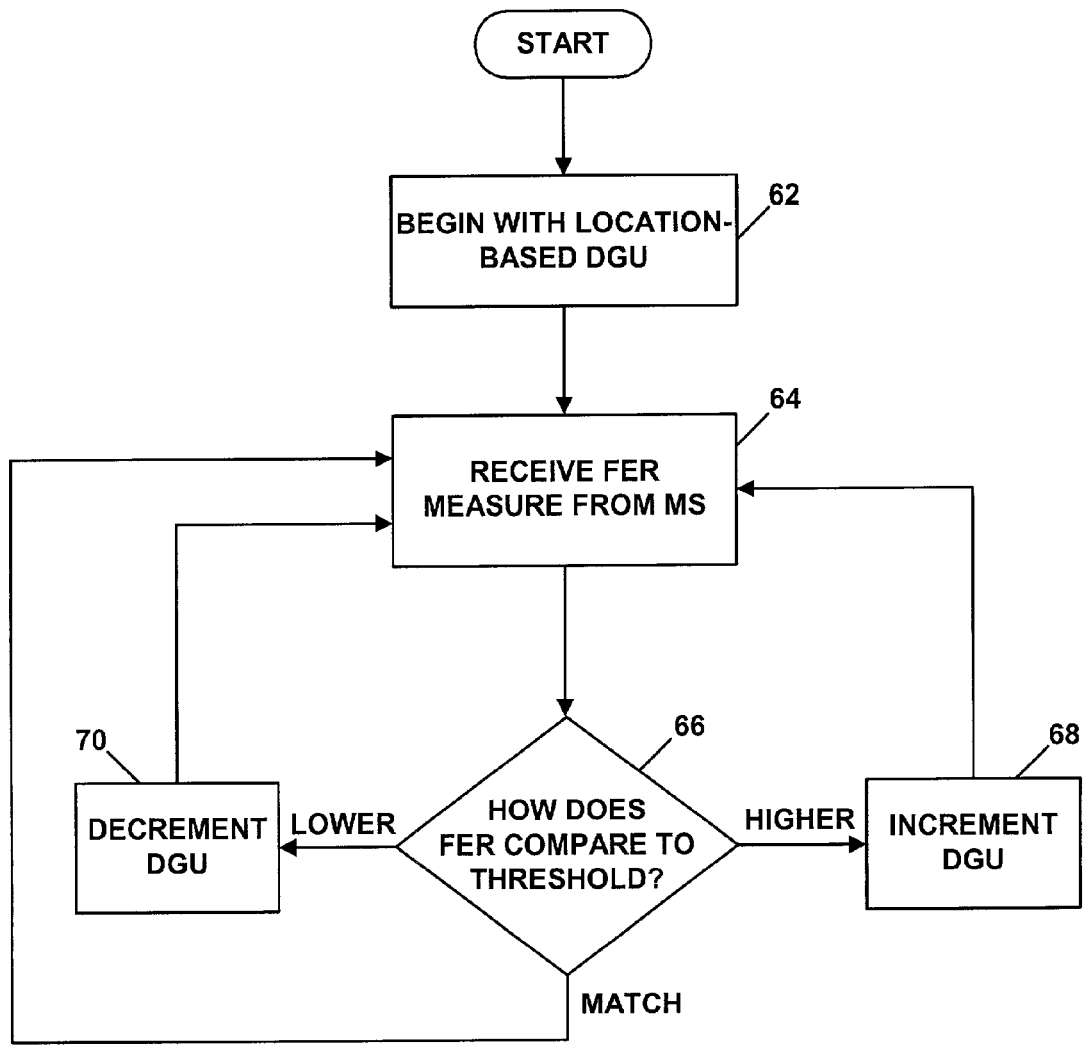
FIG. 5 is a flow chart depicting functions of a forward link power control process according to the exemplary embodiment.

Referring now to FIG. 5, an exemplary forward link power control process is illustrated. As shown at block 62, the BSC begins with the location-based DGU. Therefore, the BTS begins transmitting on the forward link at a corresponding initial power level, and the MS presumably receives that signal. At block 64, the BSC then receives a signal from the MS indicating the frame error rate in a signal received by the MS. At block 66, the BSC compares that forward link FER to a threshold FER (e.g., 1%). If the measured FER is higher than the threshold FER, then, at block 68, the BSC increments the DGU, which will cause the BTS to transmit at a higher power level. If, however, the measured FER is lower than the threshold FER, then, at block 70, the BSC decrements the DGU, which will cause the BTS to transmit at a lower power level. In the event the FER matches the threshold FER, the BSC simply returns to block 64.

An exemplary embodiment of the present invention has been described above. Those skilled in the art will understand, however, that changes and modifications may be made to this embodiment without departing from the true scope and spirit of the present invention, which is defined by the claims.

For example, the processes shown in the accompanying Figures and described above could be modified by changing the order of functions, omitting functions, adding other functions, and/or otherwise altering functions. For instance, the function of restarting the power control process when MS location changes can be omitted. Further, the function of instructing the MS what initial transmit power to use can be omitted. Still further, the location-based power control process can be applied to just the reverse link or just the forward link.

Further, the foregoing description may refer to "BTS" and "BSC" interchangeably. Therefore, various functions described as being performed by the BTS may be performed by the BSC. And various functions described as being performed by the BSC may be performed by the BTS. "Base station" may mean either or both. Further, still other entities, or combinations of entities may perform various functions as noted. Other examples are possible as well.

I claim:

1. A method of controlling power used for communication between a mobile station and a base station, the method comprising:
    the base station determining a location of the mobile station when the mobile station is going to engage in a call;
    based on the location, the base station selecting an initial power level of a primary communication channel for communication from the mobile station to the base station;
    starting at the initial power level, engaging in a power control process that regulates the power of the primary communication channel used for communication from the mobile station to the base station;
    the base station detecting a changed location of the mobile station;
    in response to detecting the changed location, the base station interrupting the power control process;
    based on the changed location, the base station selecting a new initial power level; and
    starting at the new initial power level, engaging in a new power control process that regulates the power of the primary communication channel used for communication from the mobile station to the base station.

2. The method of claim 1, wherein the base station selecting an initial power level of a primary communication channel for communication from the mobile station to the base station comprises:
    the base station referring to a database that correlates locations with initial power levels; and
    the base station selecting from the database an initial power level that is correlated with the location.

3. The method of claim 2, wherein engaging in a power control process that regulates the power of the primary communication channel used for communication from the mobile station to the base station comprises:
    the base station sending to the mobile station an instruction to transmit at the selected initial power level, whereby the mobile station responsively transmits at the selected initial power level.

4. A base station programmed to perform the functions of claim 1.

5. A method of controlling power of a primary communication channel for communications between a mobile station and a base station, the method comprising:
    determining a location of the mobile station;
    based on the location, the base station selecting a reverse link setpoint and an initial transmit power for the mobile station on the primary communication channel;
    sending to the mobile station an instruction to transmit at the initial transmit power; and
    adjusting mobile station transmit power on the primary communication channel so that a mobile station signal-to-noise ratio matches the reverse link setpoint.

6. The method of claim 5, wherein selecting a reverse link setpoint comprises:
    referring to a database that correlates locations with reverse link setpoints; and
    selecting from the database a reverse link setpoint that is correlated with the location.

7. The method of claim 5, wherein adjusting mobile station transmit power on the primary communication channel so that a mobile station signal-to-noise ratio matches the reverse link setpoint comprises:
    measuring an energy level, $E_b$, of a signal received from the mobile station;
    based on the energy level and an estimate of air interface noise, $N_o$, computing a measured value of $E_b/N_o$;
    comparing the measured value of $E_b/N_o$ with the reverse link setpoint; and
    if the measured value of $E_b/N_o$ does not match the reverse link setpoint, sending to the mobile station an instruction to adjust the mobile station transmit power on the primary communication channel.

8. The method of claim 5, further comprising:
    receiving a signal at the base station from the mobile station;
    measuring a frame error rate of the signal;
    comparing the measured frame error rate to a threshold frame error rate;
    if the measured frame error rate does not match the threshold frame error rate, adjusting the reverse link setpoint;
    using the adjusted reverse link setpoint as a basis to manage mobile station transmit power on the primary communication channel.

9. The method of claim 8, further comprising:
    based on the location, selecting a bounding value for a reverse link setpoint;
    using the bounding value as a basis to limit the reverse link setpoint.

10. The method of claim 9, wherein selecting a bounding value for a reverse link setpoint comprises:
  referring to a database that correlates locations with bounding values of reverse link setpoints; and
  selecting from the database a reverse link setpoint that is correlated with the location.

11. A base station programmed to perform the functions of claim 5.

12. A method of controlling power of communications between a mobile station and a base station, the method comprising the following steps:
  (a) determining a location of the mobile station;
  (b) based on the location, the base station selecting a setpoint and a mobile station initial transmit power on a primary communication channel;
  (c) instructing the mobile station to transmit at the mobile station initial transmit power on the primary communication channel;
  (d) computing an energy-to-noise measure for a signal received from the mobile station;
  (e) determining if the energy-to-noise measure matches the setpoint; and
  (f) in response to a determination that the energy-to-noise measure does not match the initial setpoint, instructing the mobile station to adjust the mobile station transmit power.

13. The method of claim 12, further comprising:
  (g) monitoring an error rate of signals received from the mobile station;
  (h) determining if the error rate matches a predetermined threshold;
  (i) in response to a determination that the error rate does not match the predetermined threshold, adjusting the setpoint.

14. The method of claim 13, further comprising:
  periodically repeating steps (d)-(f) and (g)-(i).

15. The method of claim 14 further comprising:
  detecting a new location of the mobile station; and
  repeating steps (b)-(f) based on the new location.

16. A base station programmed to perform the functions of claim 12.

17. A power control system comprising:
  a database that correlates locations with initial power levels; and
  a base station controller (BSC) with access to said database, the BSC being configured so that when a mobile station is going to engage in a call, the BSC determines a location of the mobile station, selects from the database an initial power level based on the location of the mobile station, and instructs the mobile station to transmit at the initial power level, the BSC being further configured so that the BSC continually monitors the location of the mobile station and, in response to detecting a new location of the mobile station, the BSC selects from the database a new initial power level based on the new location of the mobile station and instructs the mobile station to transmit at the new initial power level.

18. The power control system of claim 17, further comprising:
  a mobile positioning center (MPC), wherein the BSC queries the MPC to determine the location of the mobile station.

* * * * *